United States Patent [19]

Fontana et al.

[11] 4,091,625
[45] May 30, 1978

[54] METHOD OF INHIBITING BIRD-NESTING AT AN AIRPORT

[76] Inventors: Emilio Fontana; Rocco Fontana, both c/o 28 Skillman St., Roslyn, N.Y. 11576; Walter Schiffelholz, 292 Willets Path, Smithtown, N.Y. 11787

[21] Appl. No.: 757,968

[22] Filed: Jan. 10, 1977

[51] Int. Cl.² .................. E02D 3/00; A01G 13/00
[52] U.S. Cl. ........................................ 61/35; 47/31; 135/5 R
[58] Field of Search .............. 61/37, 38, 35; 273/27; 47/31; 135/5 R, 15 CF; 244/114 R, 114 B

[56] References Cited

U.S. PATENT DOCUMENTS

| | | | |
|---|---|---|---|
| 3,465,764 | 9/1969 | Huddle | 135/15 CF |
| 3,769,747 | 11/1973 | Chapman, Jr. | 47/31 |
| 4,008,730 | 2/1977 | Keklak et al. | 135/5 R |

Primary Examiner—Jacob Shapiro
Attorney, Agent, or Firm—Bauer, Amer & King

[57] ABSTRACT

A method which contemplates the application of a porous, fabric-like cover over bird-nesting areas at airports, to serve as a physical barrier preventing the natural use by the birds of any nominal vegetation which might grow beneath same, so as to effectively inhibit continued use of these areas for said bird-nesting activities. This, in turn, minimizes the hazards posed by birds to jet planes using the airport.

3 Claims, 6 Drawing Figures

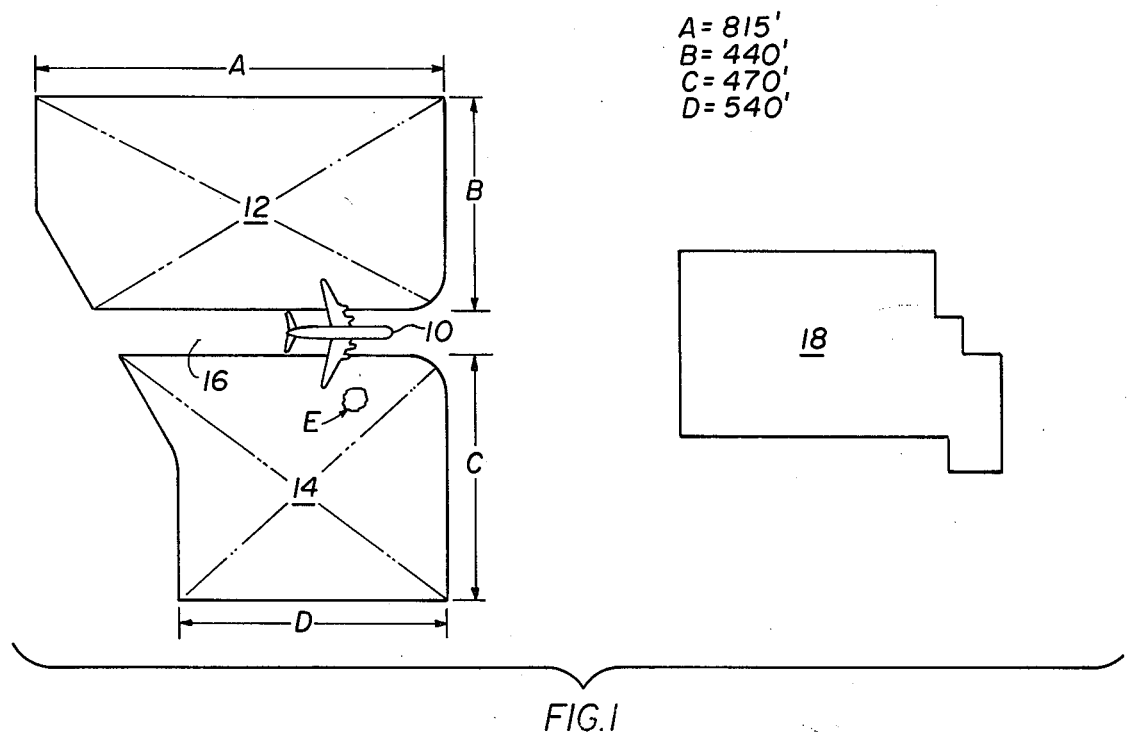
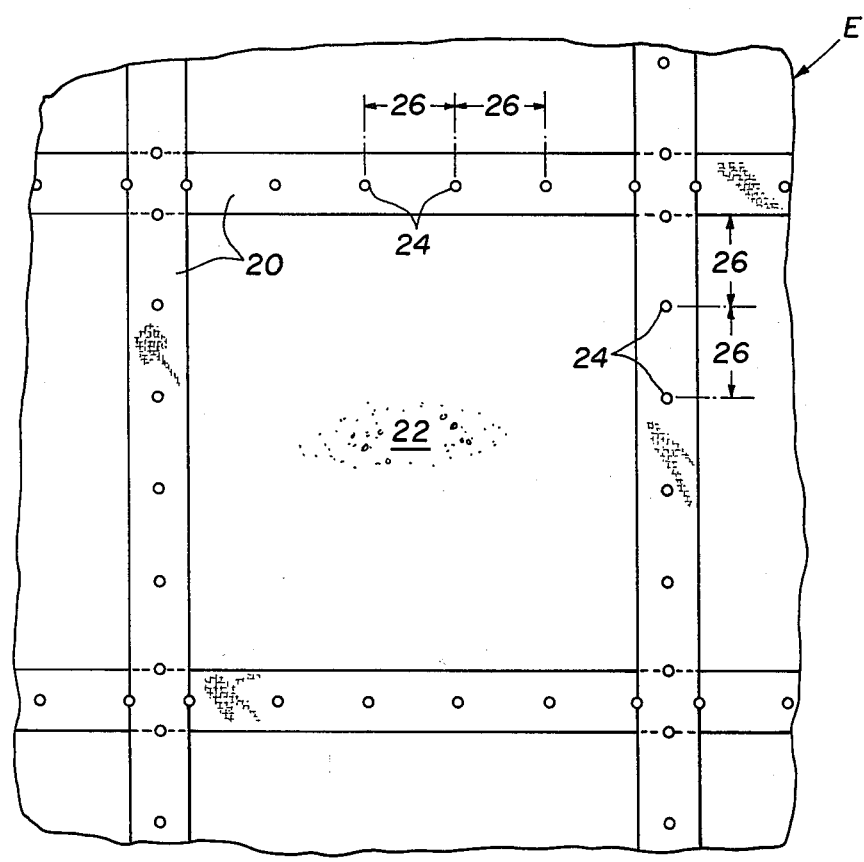
FIG.1
FIG.2A

METHOD OF INHIBITING BIRD-NESTING AT AN AIRPORT

The present invention relates generally to a practical and acceptable method of reducing the flocks of birds that inhabit airports and which, invariably, pose a safety hazard to jet aircraft, and more particularly to an effective method of inhibiting bird-nesting in areas of the airport otherwise naturally conducive to this end-use, without causing any adverse secondary effects.

Airport activities typically require the use of large-sized tracts of land, much of which is planted with vegetation to prevent soil erosion, to maintain natural water drainage, to minimize the jet blasts of taxiing aircraft from causing projectile-movement of pebbles and other loose objects, and to achieve other such results and conditions. Unfortunately, the vegetation contributes to the functioning of these areas for bird-nesting purposes, and thus to the presence of large flocks of birds in the vicinity of the landing and take-off runways of the airport. This poses a serious safety hazard to aircraft using these runways.

Broadly, it is an object of the present invention to effectively obviate the use of airport areas as natural bird-nesting sanctuaries or the like, and otherwise to overcome the foregoing and other shortcomings of vegetation growth-supporting airport areas. Specifically, it is an object to remove and thereafter prevent vegetation growth in these areas to that extent, at least, necessary for or conducive to bird-nesting purposes, while maintaining the desirable conditions provided by said vegetation, such as natural water drainage, minimum soil erosion, and other conditions.

A method of inhibiting bird-nesting at an airport in what otherwise would be a natural area for such an activity, which demonstrates objects and advantages of the present invention, comprises clearing said natural bird-nesting area of vegetation, delineating this cleared area into smaller-sized operative areas by arranging porous strips in criss-crossed relation thereover, and applying in covering relation over each said operative area a porous fabric-like panel sized to extend thereover with the peripheral edges of said panel in overlapped relation to said criss-crossed strips. As thusly applied, said panels contribute to minimal vegetation growth and serve as a physical barrier preventing the natural use by birds of said nominal vegetation as food and cover, while allowing natural water drainage through the porosity thereof.

The above brief description, as well as further objects, features and advantages of the inventive method herein will be more fully appreciated by reference to the following detailed description of a preferred exemplary use thereof, said description being in conjunction with the accompanying drawings, wherein:

FIG. 1 is a diagrammatic illustration of a typical airport environment in which advantageous use is made of the within inventive method of inhibiting bird-nesting in such environment;

FIGS. 2A and 2B illustrate the steps of the within inventive method. More particularly, FIG. 2A is a view projected from FIG. 1, on an enlarged scale, which illustrates the initial materials utilized in practicing the within method;

FIG. 2B is a perspective view which illustrates additional materials subsequently used in corresponding subsequent steps followed during the practice of the within method;

Figure 2B:
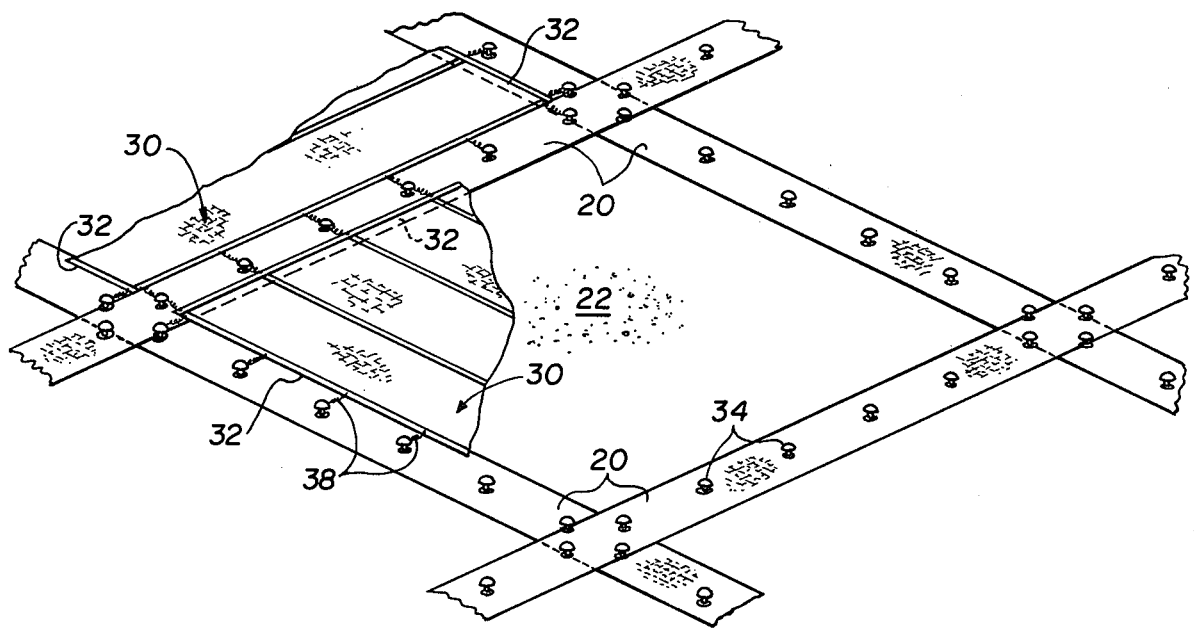

Consistent with the landing, take-off and handling of large modern day aircraft, as exemplified by the plane designated 10 in FIG. 1, a typical airport, as is intended to be illustrated in FIG. 1, includes comparatively large areas 12 and 14 which cooperate to delineate a runway 16 along which plane 10 will normally taxi in moving to and from its storage hangar 18. During the taxiing movement of plane 10, the propelling jet engines thereof are known to create wind blasts having a velocity of as much as 100 miles per hour. For this and other reasons, it heretofore has been deemed necessary to provide some vegetation in the areas 12 and 14 in order to prevent these jet blasts from causing serious soil erosion or, even more serious, from causing projectile-like movement of pebbles and other such objects in the areas 12 and 14 adjacent the runway 16. Taking Kennedy International Airport, located in Queens, N.Y., as an example, the vegetation selected for the areas 12 and 14 has included bayberries which, although solving the soil erosion and other problems mentioned, has given rise to an even more serious problem. More particularly, said selected vegetation has converted the areas 12 and 14 into natural bird-nesting areas because said vegetation serves as a source of food and cover for the birds. While the presence of flocks of birds in the natural bird-nesting areas 12 and 14 is not a safety hazard to a plane 10 taxiing to and from its storage hangar 18, the fact that these flocks of birds are located at the airport invariably results in these birds being present in large numbers in the vicinity of the landing and take-off runways of the airport. These birds inadvertently are swept into the jet engines of the planes using these runways, thereby causing malfuction of these engines and serious accidents.

The method of the present invention effectively inhibits and, for all practical purposes, minimizes any bird-nesting activities in airport areas exemplified by those designated 12 and 14. Moreover, this objective is achieved without producing any adverse secondary effects. For example, using a spray fatal to birds in area 12 would not meet with the approval of environmentalists, and merely clearing area 12 of vegetation would again introduce the soil erosion and other problems already mentioned which are aggravated by the jet blasts of planes 10 taxiing adjacent the area. Nor is it a solution to apply asphalt or concrete over the areas 12 and 14. In this connection, area 12 typically in the dimension designated A is 700 feet and in the dimension B, 440 feet, while area 14 in its dimension C might be 470 feet and in its dimension D, 540 feet, such that the areas 12 and 14 are of considerable size. Any surface applied to these areas which interferes with natural drainage is deemed not to be an appropriate solution.

It is thus one of the noteworthy aspects of the within method that it adequately and effectively minimizes or inhibits bird-nesting in a comparatively large area, while at the same time allows for natural drainage of rain or snow, and also does not give rise to the secondary defects noted. Taking area 12, for example, the method contemplates subdividing the same into smaller-sized areas for ease of management. A recommended size for each such operative area is a 30 foot square. As is perhaps best illustrated in FIG. 2A, the method contemplates as a first step the placement of plastic fabric-like strips 20 in criss-crossing relation so as to delineate the previously noted individual operative areas 22.

Figure 5:
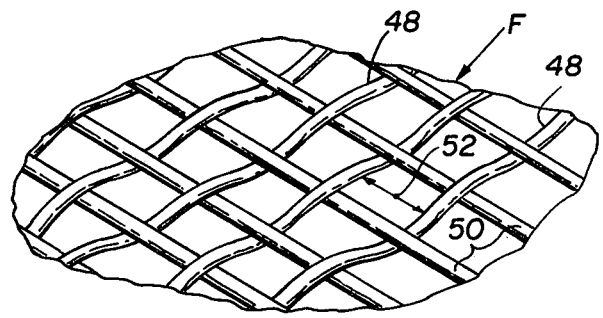
FIG. 5 is a side elevational view of an appropriate stake for maintaining the operative position of said panels during the use thereof in accordance with the present invention.

At stragetic locations, individually and collectively designated 24, the strips 20 are held in position by stakes, the preferred embodiment of each of which is illustrated in FIG. 5 and subsequently will be described in greater detail in connection with that figure. Optimum spacing between these stakes is preferably 6 feet, as illustrated by the double headed arrow 26.

Figure 3:
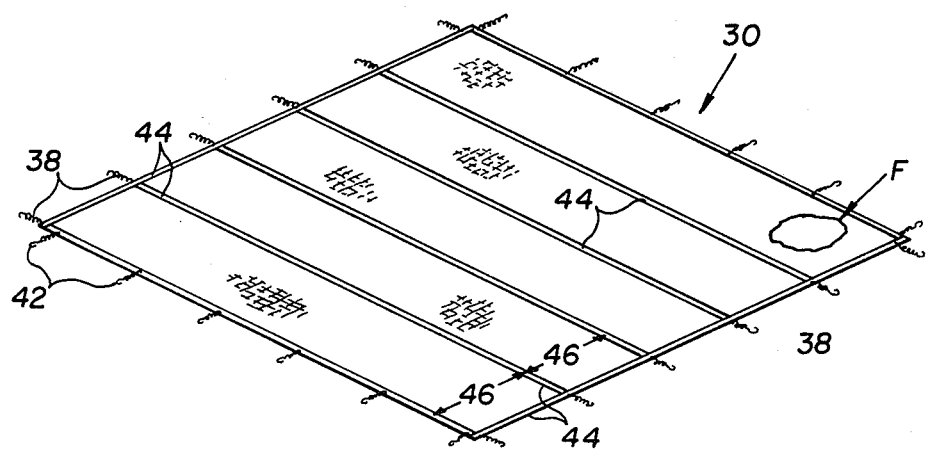
FIG. 3 is a perspective view of one of the fabric-like panels utilized in accordance with the within method.

Next, as illustrated in FIG. 2B, a porous, fabric-like panel, generally designated 30 in FIG. 3, is applied over each operative area 22. In this connection, each panel 30 is sized so as to extend not only over each operative area 22, but so that its peripheral edges also extend in overlapping relation, as at 32, with the previously installed strips 20. At this point in the description FIG. 5 can be advantageously referred to in that it indicates that at each location 24 the stake, generally designated 34 which, as previously noted, is implanted in the ground 37, includes an exposed pin-like projection 36. Connected in spanning relation between each pin 36 and a correspondingly aligning location along the peripheral edge of the panel 30 is a helical spring 38. More particularly, one end of spring 38, as at 40, is disposed in a grommet or otherwise permanently attached to the panel 30, whereas the other end thereof is formed into a hook-like configuration 42 which hooks about the pin 36. As a result, panel 30 is maintained in a taut condition in covering relation over each cooperating operative area 22.

Figure 4:
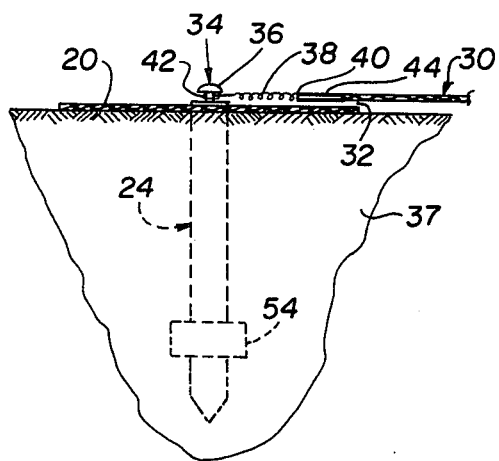
FIG. 4 is an enlarged view illustrating structural features of said fabric-like panels.

Reference should be made to FIG. 3 in which further details of a preferred construction for the covering panel 30 is illustrated. More particularly, as illustrated in this figure, each approximately 30 foot square panel 30 has its peripheral edges finished with a cloth tape 44. This tape is also strategically located in parallel relation throughout the body of the panel 30, the same being in a preferred construction at 5 foot intervals 46, as illustrated in FIG. 3. As may be best appreciated by the enlarged scale illustration in FIG. 4 of a portion F of the panel 30, the body of the panel is preferably a weave in which the warp yarns 48 are 525 denier flat, monofilament polypropylene, and the filling yarns 50 about 375 denier, round monofilament polypropylene. In said preferred construction the number of warp yarns 48 should preferably be approximately 35 per inch, whereas the fill yarns 50 should be approximately 25 per inch. The aforesaid produces a cloth which weighs not less than 3.5 nor more than 4.5 ounces per square yard. The breaking strength of such cloth should preferably be not less than 200 pounds in the warp, and not less than 100 pounds in the filling.

As already noted, the panels 30 are anchored or held in place using strategically located stakes 34. For completeness sake it should be noted that the preferred construction material for each stake 34 is 14 gauge frame steel, and is approximately 3 feet long. In its installed position, as illustrated in FIG. 5, most of the length of the stake 34 should be inserted in the ground 37 so as to provide firm support for the panels 30. Laterally extending wings 52 adjacent the depending end of each stake 34 assist in preventing inadvertent dislodgement of the stake.

In use, it has been found that the panels 30 serve as a physical barrier cutting off access of the birds, which otherwise would nest in the areas 12 and 14, from any vegetation food supply which conceivably could grow beneath the panels, as well as preventing access to such vegetation as cover which the birds require for protection against predators and adverse climate conditions. In this regard, prior to the application of the cover 30 on each of the operative areas 22, it will be understood that such area is cleared of all existing vegetation. The covering position of the panel 30 over the area 22 has been found to be effective in preventing any subsequent growth of vegetation of any significant extent. When, of course, it is necessary to work on the operative area 22 in order to remove any nominal vegetation that might occur, it is easily done by removing the panel 30 for this purpose. While the panel 30 is occupying its covering position over the operative area 22 it, of course, does not impede or interfere with the natural drainage of rain and snow since this occurs through the intestices 52 of the weave construction of each panel 30. In this way, the plural panels 30 cooperate to form a cover over comparatively large areas at airports such as the areas 12 and 14, to inhibit bird-nesting in these areas while at the same time not introducing any adverse secondary effects.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A method for inhibiting bird-nesting at an airport which otherwise has a natural bird-nesting area of a comparatively large extent thereat, said method comprising the steps of clearing said natural bird-nesting area of vegetation, arranging porous strips in criss-crossed relation over said cleared bird-nesting area to thereby delineate same into smaller-sized operative areas, and applying in covering relation over each said operative area a porous fabric-like panel sized to extend thereover with the peripheral edges of said panel in overlapped relation to said criss-crossed strips, whereby said panels contribute to minimal vegetation growth beneath the same and serve as a physical barrier preventing the natural use by birds of said nominal vegetation as food and cover, while allowing natural water drainage through the porosity thereof.

2. The method at a prescribed airport of inhibiting bird-nesting as defined in claim 2 including holding said porous strips and panels in said covering positions using stakes inserted at strategic locations throughout said cleared bird-nesting area.

3. The method at a prescribed airport of inhibiting bird-nesting as defined in claim 3 including holding each said panel in a taut condition while it is in covering relation to a cooperating operative area by using springs connected in spanning relation between said stakes and the peripheral edges of said panel.

* * * * *

UNITED STATES PATENT AND TRADEMARK OFFICE
CERTIFICATE OF CORRECTION

PATENT NO. : 4,091,625

DATED : May 30, 1978

INVENTOR(S) : Emilio Fontana; Rocco Fontana; Walter Schiffelholz

It is certified that error appears in the above-identified patent and that said Letters Patent are hereby corrected as shown below:

column 4: In claim 2, second line, "2" should read 1.

In claim 3, second line, "3" should read 2.

Signed and Sealed this

Twenty-fourth Day of October 1978

[SEAL]

Attest:

RUTH C. MASON
Attesting Officer

DONALD W. BANNER
Commissioner of Patents and Trademarks